Nov. 22, 1938.  T. E. BRYAN  2,137,441
GAS LIFT VALVE
Filed Oct. 3, 1936

Inventor
Thomas E. Bryan

Patented Nov. 22, 1938

2,137,441

UNITED STATES PATENT OFFICE 2,137,441

GAS LIFT VALVE

Thomas E. Bryan, Oklahoma City, Okla.

Application October 3, 1936, Serial No. 103,824

17 Claims. (Cl. 103—232)

This invention relates in general to well flowing apparatus, and more particularly has reference to a valve means for controlling the admission of gas under pressure into a column of fluid to raise the fluid out of the well.

This application is a continuation in part of the applicant's co-pending application Serial No. 55,866 filed December 23, 1935.

It is an object of this invention to provide a means for controlling the admission of gas under pressure into a column of fluid to raise the same from the well.

More specifically, it is an object of this invention to provide a valve which will control the admission of gas under pressure into a column of fluid in such a manner that the valve will open when the hydrostatic pressure due to the column of oil above the valve reaches a predetermined value which is less than the pressure of the gas which is to enter through the valve to aerate the column.

Another specific object of this invention is to provide a valve of the character referred to, which valve shall be subject in its operation to the pressure of the column of fluid in the well tending to open the valve and to the pressure of the gas to be utilized in flowing the well, the pressure of said gas tending to close the valve, and that this valve shall be so arranged that it will open when the pressure due to the hydrostatic head of the column of fluid above the valve reaches a given value, which value is less by a predetermined amount than the pressure of the gas to be used for aerating the column.

Another specific object of the invention resides in the provision of a differential type gas controlling valve having a dual seating arrangement and a principal valve element operating to control the flow of motive fluid through the device, such principal valve element having a cooperative seating element associated therewith and functioning to retard the principal element in its progress toward its seat by fluid pressure impinging thereon until the maximum velocity of pressure passing around the principal element and through its seat has been accomplished, whereupon the principal element is suddenly snapped to its seat closing the orifice against further passage of external pressures until the internal pressure of the oil reaches a certain value in relation to the external pressures effective against the extreme area of the valve elements whereupon the valve will open, aided by a spring element, to its maximum open position admitting external pressures therethrough.

Still another object of the invention is manifest in the provision of a valve of the character described presenting an entirely automatic intermitting device differing from conventional types of valves designed for such purposes in that such ordinary valves do not operate suddenly or positively but open and close gradually allowing gas pressures to pass through around the seats before they have been entirely opened or closed and obviously necessitates a substantial increase in external pressures to take care of the required volume of fluid pressures passing inwardly through the tubing to accomplish the desired results. Palpably, unless the maximum area of the passage through which the motive fluid enters the tubing is maintained until the maximum velocity of such fluid therethrough is accomplished, a substantial increase in pressure is necessary to pass the required volume of motive fluid through the valve into the fluid column. Such a condition defeats intermitting at effective differentials and a constant passage, in varying volume of motivating fluid, results.

One of the principal objects of this invention, therefore, is that of providing an assembly whereby the principal valve element closing the port through which the motive fluid passes into the tubing from the exterior thereof is retained in maximum open position, without minimizing the area of the passage, until a maximum volume or velocity, of the port has been reached at which time the valve elements are caused, by such velocity, to snap from the maximum open position to their seats, the existing predetermined pressures of motive fluid passing into the valve and impinging the secondary seating element of the structure maintaining the principal valve element away from its seat until such time as the rush of the fluid through the port shall have reached its volume capacity therethrough which action suddenly seats the principal element closing such port.

Another specific object is to provide a valve of the character referred to in which the velocity of gas entering through the valve when the valve is open will exert a force on the valve tending to close the same.

One other specific object is to provide a fitting forming a part of the tubing of a well and providing a chamber out of the direct tubing opening for accommodating a valve of the general character referred to, thus providing an unobstructed tubing opening while at the same time providing for the operation of the valve at its fullest efficiency.

The foregoing and other objects will more fully appear from the following description and the accompanying drawing in which like numerals indicate corresponding parts throughout, it being understood, however, that the said drawing and description are by way of illustration and example only, and are not to be taken as a limitation upon the spirit or scope of this invention. Such limitation will be only by the prior art and by the terms of the appended claims.

Figure 1:
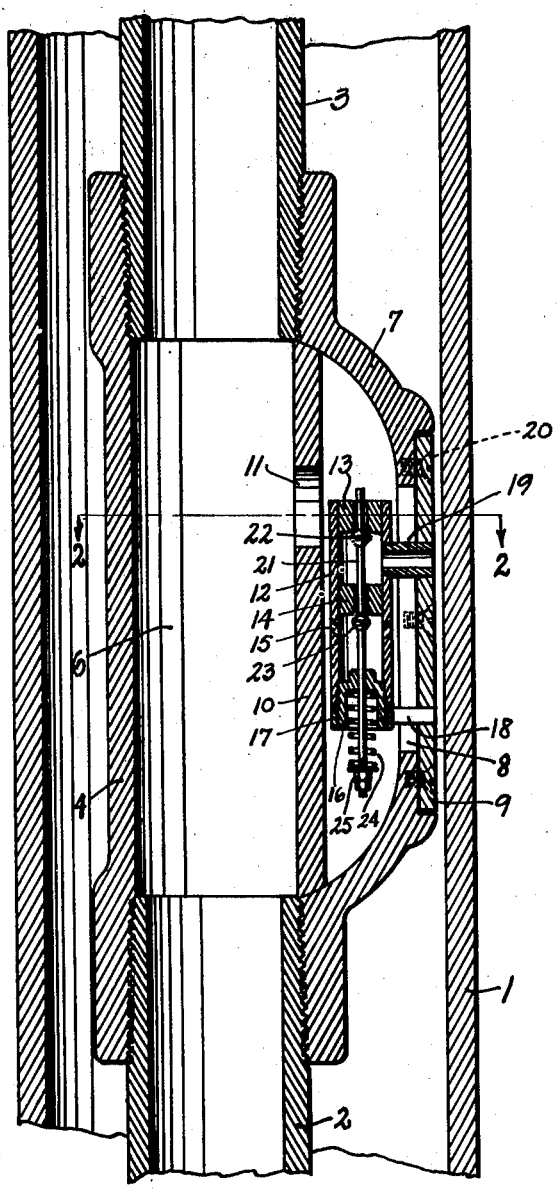
Fig. 1 is a vertical cross section illustrating a valve constructed in accordance with this invention in place within a well.
Figure 2:
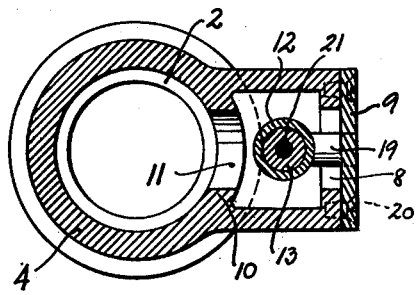
Fig. 2 is a horizontal cross section taken along the line 2—2 of Fig. 1 looking in a downward direction.
Figure 3:
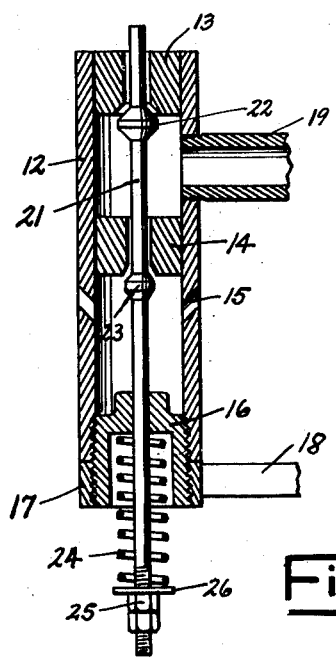
Fig. 3 is an enlarged vertical cross section illustrating the details of the valve proper.

In Fig. 1 the numeral 1 represents the casing customarily employed in an oil well, and the numerals 2 and 3 designate respective sections of tubing inserted in the casing for the purpose of flowing the well.

Intermediate the sections 2 and 3 of the tubing there is illustrated a special fitting 4 having a main passageway 6 therethrough forming a continuation of the passageway through the tubing. This fitting is formed with a lateral extension 7 having an opening 8 therein on the side opposite the passageway 6. This opening 8 is normally closed by a cover plate 9. The lateral extension 7 is formed into a chamber separate from the main passageway 6 by means of a partition 10 interposed therebetween. This partition 10 has a single opening 11 therethrough affording communication between the chamber within the lateral extension and the main passageway 6 through the fitting.

Within the chamber in the lateral extension is positioned a valve constructed in accordance with this invention having a tubular body 12, in the upper end of which is disposed a valve seat member 13. A second valve seat member 14 is disposed at an intermediate point within the tubular body 12. Below the seat member 14 the tubular body 12 is provided with lateral outwardly and upwardly inclined openings 15 forming vents for the escape of gas from the valve in a manner which will be presently described.

At its lower end, the valve body is internally threaded to receive a plug 16, this plug having a portion projecting from the body member 12 and threaded to receive a ring 17 forming a part of a bracket member 18. This bracket member 18 is secured to the inner face of the plate 9 to assist in supporting the valve within the chamber in the special fitting. Intermediate the two valve seats 13 and 14 the valve body 12 is provided with a lateral opening threaded to receive the inlet nipple 19. This inlet nipple 19 is in communication with an opening through the plate 9 and is secured to the plate 9 so as to provide an additional support for the valve body 12. The plate 9 is secured in its position by any means which will permit its ready removal such as for instance the small screws 20. Extending upwardly through the valve body 12 is a valve stem 21 having valve elements 22 and 23 thereon adapted to seat respectively against the valve seats formed in the seat members 13 and 14. It is to be noted at this point that the opening through the valve seat member 13 is larger than that through the valve seat member 14, and that the valve element 22 is of larger diameter than the valve element 23. For this reason, it will be apparent that any pressure which exists in the main passageway through the tubing and the special fitting will exist also in the chamber in which the valve is located, and will have a tendency to open the valve because it will exert a greater total force against the upper valve element 22 than against the lower valve element 23. On the other hand, the pressure of the gas which is to be maintained in the space between the tubing and the casing will be exerted through the nipple 19 and against the opposite sides of the valve elements 22 and 23, and the result of this pressure will tend to maintain the valve in closed position.

Surrounding the valve stem 21 below the plug 16 is a spring 24 held in place on the valve stem by means of nuts 25 and a washer 26. It will be seen that this spring exerts at all times a force tending to urge the valve to open position so that the elements 22 and 23 are unseated to permit the gas to pass from the space within the casing to that within the tubing.

In operation, it is intended in the illustration shown that a high gas pressure shall be maintained within the annular space between the tubing and the casing, and that the well fluid shall be permitted to rise within the tubing to a predetermined height which is less than the height to which the natural pressure within the well will cause it to flow. As this column of fluid rises in the tubing above the position of the valve illustrated, it exerts an ever-increasing pressure due to its hydrostatic head, and this pressure is conveyed through the port 11 so as to permit it to act upon the upper and lower valve elements 22 and 23, respectively. It is intended that when no pressure exists within the tubing at the point where the valve is located, the pressure of the gas within the casing will be sufficient by its action on the respective valve elements to maintain the valve in closed position against the force exerted by the spring 24. However, when the hydrostatic head of fluid within the well reaches a predetermined value corresponding to the above mentioned predetermined height, this valve, depending upon the tension of spring 24, the force exerted by this hydrostatic head, together with the tension of the spring 24, will cause the valve to suddenly open and admit gas from the space within the casing into the tubing. This will aerate the column of fluid within the tubing, and cause it to flow from the well. As the fluid flows from the well and the hydrostatic head at the point where the valve is located gradually falls due to the decreasing amount of fluid thereabove, the force exerted upon the valve tending to hold it in open position will gradually decrease. At the same time, the velocity of gas entering the tubing through the valve will increase due to the greater differential between the pressure existing in the tubing and that existing in the casing. This incoming gas will, therefore, exert an ever-increasing force upon the valve tending to close the same, and as soon as this force becomes great enough to overcome the tension of spring 24 and the decreasing hydrostatic head within the tubing, the valve will suddenly close. It will then remain closed until the fluid again rises in the tubing to a height sufficient to cause it to open.

When the liquid within the tubing 3 has been increased to a predetermined level, as hereinbefore stated, sufficient to create a force against the valve elements 22 and 23 to open the same, the existing fluid presses within the casing 1 surrounding the tubing 3 entering the valve housing 12 through the nipple 19 will pass upwardly and into the tubing through the port extending through the seat member 13 around the valve stem 21 and thence through the port 11 in the partition 10 and into the passage 6 within the tubing and at once exerting a counterpressure downwardly through the port within the seat member 14 against the valve element 23 which is also connected to the stem 21 and thus arresting the upward movement of the stem 21 and the element 22 toward its seat 13 retaining the element 22 in a position with respect to its seat 13 which will not restrict or minimize the area of the port through the seat 13 nor the conical annular space between the element 22 and the said seat 13 in which position the element 22 will remain until the maximum velocity of the motive fluid through the seat 13 is accomplished whereupon the member 22 is quickly and suddenly urged to its seat shutting off any further flow of the gas pressure through the valve.

As the liquid column within the tubing rises the internal pressure increases and when a predetermined differential is reached the valve elements 22 and 23 are opened, aided by the action of the spring 24, to their maximum position thus permitting the flow of motive fluid through the port extending through the seat 13 of the valve into the tubing to flow the liquid column therein in the same manner as hereinbefore described. It is important to note that gas pressures externally of the tubing, although moving the principal element 22 toward its seat 13, also impinges the upper surface of the element 23 to exert a counteracting force downwardly sufficiently to prevent the member 22 moving toward its seat sufficiently to reduce the maximum area of the passage through the seat 13 until the maximum velocity of the fluid therethrough is accomplished, or the maximum capacity of any motivating pressure of the port is reached, which eventually causes the member 22 to seat itself with a sudden action shutting off the further flow of motive fluid. The tension of the spring 24 may be varied by the adjusting nuts 25 in order to create a proper differential between internal and external pressures sufficient to retain the valve in open position and it is pointed out that without the element 23 it would be necessary to provide a much larger spring 24 to resist the velocity effect of the motivating fluid on the valve and retain the elements 22 and 23 in open position as against external pressures of the motivating fluid in the casing.

It is to be distinctly understood that the fluid in the tubing will not be permitted to rise as high as the natural formation pressure will raise it before the valve opens. Instead, it is only permitted to rise a predetermined distance above the valve, and when this point is reached, the valve opens and the fluid in the fluid column is forced out of the well.

It will be seen from the foregoing that a device has been provided which will positively control the influx of gas under pressure into a column of fluid in a well for the purpose of raising the column of fluid and causing it to flow from the well. It will further be seen that this device will act to admit such a gas under pressure only when there is a predetermined column of fluid above the device. It will be seen that the action of the valve will be intermittent, and that the fluid from the well will be caused to flow therefrom at intervals depending upon the rate at which the fluid is produced by the well formation.

It is to be understood that while the present illustration contemplates that the well shall be flowed through the tubing, it is entirely within the spirit of this invention that the parts shall be so arranged by mere reversal that the well may be flowed through the casing.

It is also to be understood that while in this instance the valve is shown disposed in a lateral chamber having a single opening communicating with the fluid column, as many openings as desired might be provided instead of the single opening, or the valve might be placed directly in the fluid column without change in the basic principles of its operation.

From the foregoing it will be seen that a device has been provided which is capable of carrying out all the objects set forth above, and sought by this invention.

Having described my invention, I claim:

1. In a valve of the character set forth, a hollow body having a plurality of valve seats therein, and having an inlet opening between said valve seats, a valve rod extending therethrough, valve elements on said valve rod adapted to seat upon said seats, respectively, and adjustable tensioned means connected with said valve rod to constantly urge the same in a direction to move said valve elements away from their seats.

2. In a valve of the character set forth, a hollow body having a plurality of valve seats therein, and having an inlet opening between said valve seats, a valve rod extending therethrough, valve elements on said valve rod adapted to seat upon said seats respectively, one of said valve elements being located between said valve seats and being of larger diameter than the other of said valve elements, whereby fluid under pressure in said inlet opening will tend to urge said valve elements toward their seated position, and resilient means connected with said valve rod to urge the same in a direction to move said valve elements away from their seats.

3. In a valve of the character set forth, a hollow body having a plurality of valve seat members therein, each of said valve seat members having a passageway therethrough and a valve seat formed thereon, both of said valve seats facing toward one end of the valve body, said valve body having an inlet opening intermediate said valve seat members, a valve rod extending through said valve seat members, valve elements thereon adapted to seat against said valve seats, respectively, and tensioned means on said valve rod for constantly urging said valve rod in a direction to move said valve elements away from their respective seats.

4. A fitting adapted to form part of a well tubing, said fitting having a passageway therethrough in substantial alignment with the tubing to which it is to be connected, and having a laterally disposed valve chamber, a valve arranged in the said valve chamber controlling the flow of motive fluid, through the said fitting, a communication between the said chamber and the interior of the said fitting, said chamber having an opening through its exterior wall, a removable closure for said opening, and valve supporting means on the inner surface of said closure supporting such valve.

5. A fitting adapted to form part of a well tubing, said fitting having a passageway therethrough in substantial alignment with the tubing to which it is to be connected, and having a laterally disposed valve chamber, a communication between the said chamber and the said passageway, a valve mounted within the said chamber, regulating the flow of motivating fluid through the said fitting, said chamber having an opening through its exterior wall, a removable closure for said opening, and valve supporting means on the inner surface of said closure supporting the said valve, said closure having an aperture therein providing communication between said chamber and the exterior of said tubing.

6. In combination, a fitting adapted to form part of a well tubing, said fitting having a passageway therethrough in substantial alignment with the remainder of the tubing, and having a laterally disposed chamber in communication with said passageway and with the exterior of said tubing, a partition between said passageway and said chamber having an opening therethrough providing the communication between said passageway and chamber, said chamber having an opening through its exterior walls, a removable closure for said opening having an aperture therein providing the communication between said chamber and the exterior of said tubing, and a valve within said chamber supported on said closure and controlling flow between the exterior and the interior of said tubing through said chamber.

7. A fitting adapted to form a part of a well tubing, said fitting having a passageway therethrough in substantial alignment with the tubing to which it is to be connected and having a laterally disposed valve chamber, a communication between the said chamber and the said passageway, a portion of the exterior wall of said chamber being removable an inlet port for the said chamber through the exterior wall thereof, and a valve attached to the said removable exterior wall controlling the fluid passage between the exterior and interior of the said tubing.

8. In a valve of the character set forth, a hollow body having a plurality of valve seats therein, and having an inlet opening between said valve seats, a valve rod extending therethrough, valve elements on said valve rod adapted to seat upon said seats, respectively, one of said valve elements being located between said valve seats and being of larger diameter than the other of said valve elements, whereby fluid under pressure in said inlet opening will tend to urge said valve elements toward their seated position, and resilient means cooperating with said valve rod and said hollow body to urge said valve rod in a direction to move said valve elements away from their seats.

9. In a valve of the character set forth, a hollow body having a plurality of valve seat members therein, each of said valve seat members having a passageway therethrough and a valve seat formed thereon, both of said valve seats facing toward one end of said valve body, said valve body having an inlet opening intermediate said valve seat members, a valve rod extending through said valve seat members, valve elements thereon adapted to seat against said valve seats, respectively, and resilient means cooperating with said valve rod and said hollow body for constantly urging said valve rod in a direction to move said valve elements away from their respective seats.

10. In a gas lift valve, a hollow body having a plurality of valve seats therein facing in the same direction and having an inlet opening between said valve seats, a valve rod slidably extending therethrough, valve elements on said valve rod adapted to seat simultaneously on said valve seats, one of said valve elements operating between said valve seats in the zone of the inlet opening and being greater in diameter than the other of said valve elements whereby fluid under pressure passing through the hollow valve body between and through the seats urges the larger valve element against its seat and yieldable means aiding in disengaging the said valve element from its seat in cooperation with well fluid pressures.

11. In a gas lift valve of the class described in claim 10, whereby the motive fluid admitted between the valve seats exerts a counterpressure in opposite directions simultaneously against the said valve elements maintaining the said valve elements in open position until a maximum velocity through the valve has been obtained.

12. In a valve of the character set forth, a hollow body, a plurality of seats therein, a valve rod slidably operable through said seats, valve elements on said valve rod engageable with said seats, a motive fluid inlet between said seats, outlets for the said fluid around the valve rod through said seats in opposite directions, resilient means assisting in maintaining the valve rod in its lowermost position until a maximum velocity of motive fluid through the upper seat urges the valves against their seats in sudden snap action.

13. In a gas lift valve having a hollow body, a plurality of seats arranged within the said body, a valve rod operating through the said seats, a principal valve element and a secondary valve element arranged for concerted movement upon the said rod and cooperating with the said seats, yieldable means secured to the lowermost end of the said rod, a communication through the said housing between the said seats whereby motive fluid entering through the said communication and the said seats impinges the said secondary element arresting the movement of both of the said elements toward their seats until a maximum velocity of the said motive fluid through the said valve exists.

14. In a gas lift valve, a hollow body having a plurality of valve seats therein facing in the same direction and having a motive fluid inlet opening between the said valve seats, passages through the said seats, a valve rod slidably extending therethrough, valve elements on the said valve rod simultaneously engaging the said valve seats, one of said valve elements operating between said valve seats in the zone of the inlet opening and being greater in diameter than the other said valve element, a resilient means associated with the said rod, portions of the said valve elements exposed to well fluid pressures, the exposed portion of the larger element exceeding the said exposed portion of the smaller element whereby the said well fluid pressures, aided by the said resilient means and the passage of motive fluid through said inlet opening and the said seats, urges the valve element to the maximum open position.

15. In a gas lift valve, a hollow body having a plurality of valve seats therein facing in the same direction and having a motive fluid inlet opening between the said valve seats, passages through the said seats, a valve rod slidably extending therethrough, valve elements on the said valve rod simultaneously engaging the said valve seats, one of said valve elements operating between said valve seats in the zone of the inlet opening and being greater in diameter than the other said valve element, a resilient means associated with the said rod, portions of the said valve elements exposed to well fluid pressures, the exposed portion of the larger element exceeding the said exposed portion of the smaller element whereby the said well fluid pressures, aided by the said resilient means, urges the valve element to the maximum open position.

16. In combination, a fitting forming a part of a well tubing having a passageway therethrough in substantial alignment with the remainder of the tubing to which the said fitting is attached, a partition extending longitudinally to the said passage, an opening through the said partition, a seat formed in a parallel plane with the said partition, a cover received by the said seat forming a valve chamber, a valve supported within the said chamber by the said cover controlling the flow of motive fluid through the said fitting and a passage through the said cover affording a communication between the exterior and interior of the said chamber.

17. In combination, a fitting having a liquid flow channel therethrough, a seat formed on one side thereof, a partition between the said seat and the said flow channel, a cover received by the said seat forming a chamber, a communication through the said partition between the said flow channel and the said chamber, a valve supported within the said chamber by the said cover controlling the passage of motivating fluid through the said fitting and a communication between the valve chamber and the exterior of the said fitting through the said cover.

THOMAS E. BRYAN.